(12) United States Patent
Bancroft

(10) Patent No.: US 8,437,149 B2
(45) Date of Patent: May 7, 2013

(54) FULLY RESONANT POWER SUPPLY

(75) Inventor: Christopher M. Bancroft, Wakefield, NH (US)

(73) Assignee: University of New Hampshire, Durham, NH (US)

( * ) Notice: Subject to any disclaimer, the term of this patent is extended or adjusted under 35 U.S.C. 154(b) by 319 days.

(21) Appl. No.: 12/977,193

(22) Filed: Dec. 23, 2010

(65) Prior Publication Data

US 2011/0157935 A1 Jun. 30, 2011

Related U.S. Application Data

(60) Provisional application No. 61/289,752, filed on Dec. 23, 2009.

(51) Int. Cl.
*H02M 3/335* (2006.01)

(52) U.S. Cl.
USPC ............................................. 363/16; 363/39

(58) Field of Classification Search .................... 363/16, 363/15, 39, 123
See application file for complete search history.

(56) References Cited

U.S. PATENT DOCUMENTS

| | | | |
|---|---|---|---|
| 4,713,553 A * | 12/1987 | Townsend et al. | ............... 307/64 |
| 5,523,556 A | 6/1996 | Meddaugh et al. | |
| 5,548,502 A | 8/1996 | Kosugi | |
| 6,693,804 B2 | 2/2004 | Suzuki | |
| 7,030,355 B1 | 4/2006 | Bochenski et al. | |
| 2001/0036091 A1 | 11/2001 | Yasmura | |
| 2003/0048645 A1 | 3/2003 | Hosotani | |
| 2004/0160286 A1 | 8/2004 | Ward | |

* cited by examiner

*Primary Examiner* — Shawn Riley
(74) *Attorney, Agent, or Firm* — Paul C. Remus; Devine, Millimet & Branch

(57) ABSTRACT

A power supply produces one or more conditioned and scaled output voltages with low noise. The power supply has various components to produce a plurality of higher output voltages from a plurality of taps of a multiplier or multiple isolated outputs. Components include an internal reference voltage circuit or an external voltage that generates a reference voltage and a sine wave power oscillator circuit and resonant circuit that generates an alternating current and voltage. The power supply has a controlled current source circuit connected to the sine wave power oscillator circuit for regulating the power level to the sine wave power oscillator. A control amplifier circuit controls the current level to the controlled current source circuit based on the error between the sampled output and the reference voltage. The resonant transform connected to the sine wave power oscillator circuit generates one or more scaled output voltages on one or more secondary windings. A buffer voltage feedback circuit is connected to an output voltage and the control amplifier circuit for providing a feedback loop to regulate the output voltage.

14 Claims, 10 Drawing Sheets

FULLY RESONANT POWER SUPPLY

CROSS-REFERENCE TO RELATED APPLICATIONS

The present application claims the benefit of Provisional Patent Application No. 61/289,752 filed Dec. 23, 2009, which is incorporated herein by reference.

FIELD OF THE INVENTION

The present invention relates to a power supply. More specifically, it relates to a system of a power supply that is fully resonant and has the advantage of low noise and current transformation capability.

BACKGROUND OF THE INVENTION

For electronic systems, there historically have been two basic classes of power supplies: analog or linear power supplies and digital or switching mode power supplies. Each type of power supply had its advantages and limitations.

A linear power supply has very low noise levels, at the expense of having relatively low efficiency and being limited to output voltages that are lower than the input voltages. The efficiency is typically the ratio of the output voltage to the input voltage, with the output current equal to the input current at best. The primary application of a linear supply is to provide a highly regulated and stable output voltage with very low noise.

The other class of power supply, a switching power supply, on the other hand, can have a very high efficiency at the expense of having high levels of noise that are difficult or impossible to eliminate. The noise levels tend to vary inversely with the efficiency of the supply. For a very high efficiency supply, the switching device needs to spend the minimum time when the device is not saturated or open circuited. That is a minimum time when the switching device is switching. However, the impulse noise generated in the supply is due to the fast switching transients and extends to high frequencies, going to higher frequencies as the transition time decreases. Thus, the noise increases with efficiency.

A switching power supply can be configured in numerous ways including buck, boost, buck-boost, fly-back, and CUK. Since all typically use storage elements such as inductors and/or capacitors, the power supplies have the ability to transform voltages in ways that linear supplies cannot, enabling them to provide multiple simultaneous outputs at widely differing voltages and currents.

The two basic types of conventional power supplies each have their own short comings. Neither type can simultaneously provide voltage transformation and/or current transformation capabilities and low noise operation.

SUMMARY

In an embodiment of the invention, the power supply includes a novel sine wave power oscillator circuit. A controlled current source circuit drives the sine wave power oscillator circuit for regulating the sine wave power oscillator. A control amplifier circuit is connected to the controlled current source circuit. The control amplifier circuit controls the current level to the controlled current source circuit. The control amplifier circuit has a feedback circuit for providing a feedback loop to regulate the output voltage. A resonant transformer is connected to the sine wave power oscillator circuit for generating the output voltage on one or more secondary windings.

One application for this approach is uniquely suited to powering a PMT or similar device that requires multiple output voltages. The supply when used with a Cockcroft-Walton multiplier requires significantly less current than conventional approaches for powering a PMT or other device requiring multiple voltages by eliminating the resistive divider conventionally used. The power supply of the present invention replaces the dissipative divider with a capacitive divider for powering multi-dynode photomultiplier tubes (PMTs) and multi-anode photomultiplier tubes (MAPMTs). Currently, PMT power sources typically require about 750 mW of power for PMTs; the disclosed technology requires about 10 mW to 50 mW. The reduction in power requirements also results in a reduction in weight and size of the power supply, as well as reduction of the localized heating of the resistive divider. Overall, the technology delivers low noise, high reliability, and reduced (eliminated) heat stress for the individual components of the power supply as well as the powered tube.

The resonant power supply has a clean sine wave output that is well filtered with the output multiplier, permitting operation in close proximity to the photomultiplier tube without the noise contamination of conventional approaches, and permits the maximum operating dynamic range. Since the Cockcroft-Walton multiplier assures that all stages maintain the same voltage, the increase in photomultiplier gain with high event rates and high energy events due to voltage variations with a resistive divider is eliminated.

In an embodiment of the invention, the power supply produces high voltage with low noise. The power supply can have a reference voltage circuit for receiving an input voltage and a control. The reference voltage circuit generates a reference voltage for control of the output, or an external reference voltage source can be used. A sine wave power oscillator circuit of the power supply is connected to a voltage controlled current source, which compares a sample of the output voltage to the reference voltage from the reference circuit or the external reference voltage. The sine wave power oscillator circuit generates an resonant voltage in a center-tapped winding of an inductor or transformer. The oscillation is maintained by the resonant oscillator, with the current source replacing the energy lost in each cycle to either the output or internal loss elements of the resonant circuit.

A control amplifier circuit of the system is connected to both the reference voltage circuit and the controlled current source circuit. The control amplifier circuit controls the current level to the controlled current source circuit. The system has a resonant transformer connected to the input voltage and the sine wave power oscillator circuit. The resonant transformer with alternating current from the sine wave power oscillator circuit is capable of generating higher or lower output voltages on one or more secondary windings. A sample of the output voltage is connected to the control amplifier circuit for providing a feedback loop to regulate the output voltage. The power supply has a Cockcroft-Walton multiplier with a plurality of taps to provide a plurality of higher output voltages as required by the photomultiplier tube being powered.

These aspects of this embodiment of the invention are not meant to be exclusive and other features, aspects, and advantages of the present invention will be readily apparent to those of ordinary skill in the art when read in conjunction with the following description, appended claims, and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

PREFERRED EMBODIMENTS OF THE INVENTION

A power supply produces one or more conditioned and scaled output voltages with low noise. The power supply has various components to produce a plurality of higher output voltages from a plurality of taps of a multiplier or multiple isolated outputs. Components include an internal reference voltage circuit or an external voltage that generates a reference voltage and a sine wave power oscillator circuit and resonant circuit that generates an alternating current and voltage. The power supply has a controlled current source circuit connected to the sine wave power oscillator circuit for regulating the power level to the sine wave power oscillator. A control amplifier circuit controls the current level to the controlled current source circuit based on the error between the sampled output and the reference voltage. The resonant transform connected to the sine wave power oscillator circuit generates one or more scaled output voltages on one or more secondary windings. A buffer voltage feedback circuit is connected to an output voltage and the control amplifier circuit for providing a feedback loop to regulate the output voltage.

Figure 1:
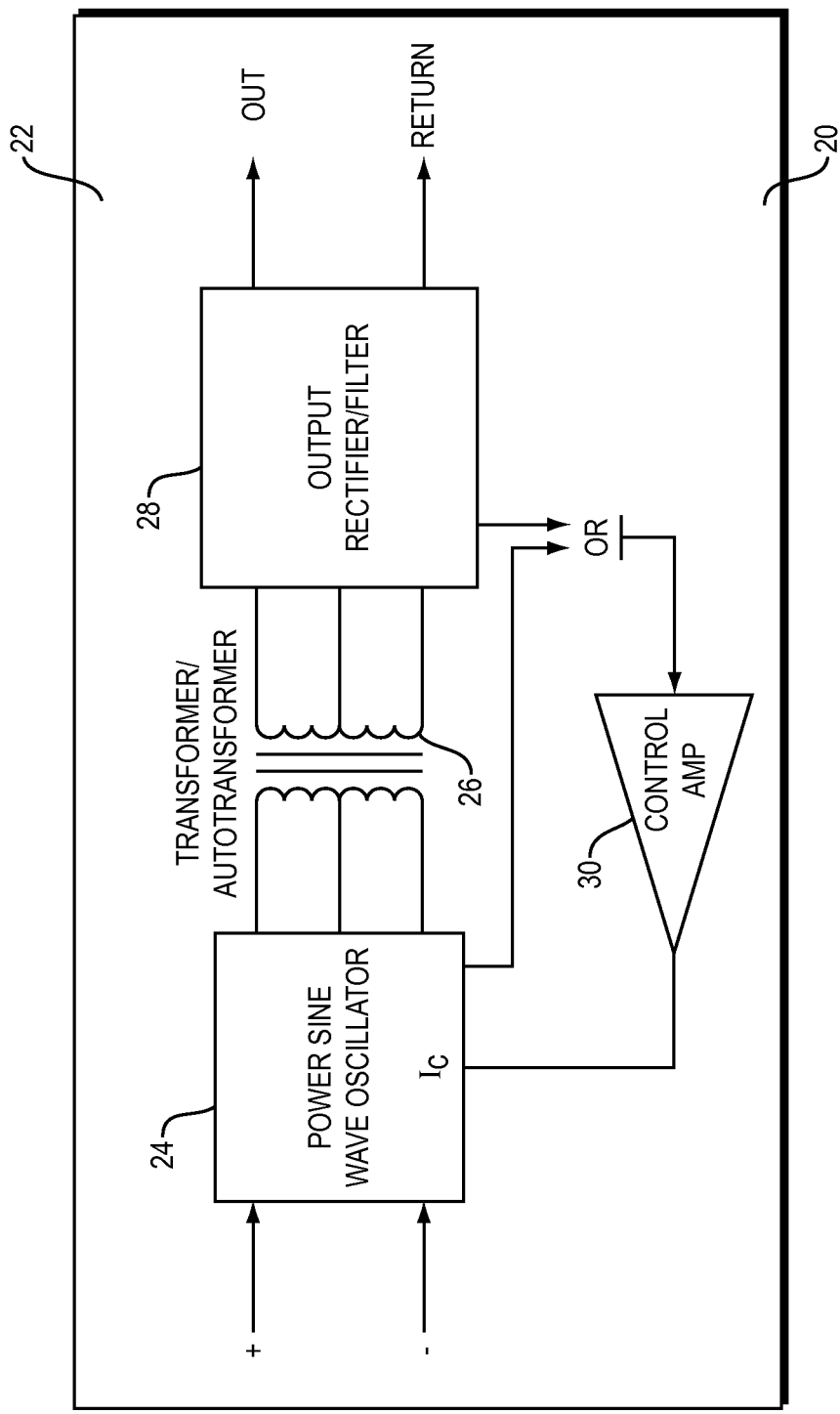
FIG. 1 is a block diagram of a power supply system according to the invention.

Referring to FIG. 1, a block diagram of a power supply system 20 according to the invention is shown. The power supply system 20 basic design consists of four basic components 22: a power sine wave oscillator 24 that receives the DC input voltage, a transformer 26 that converts the generated sine wave voltage to one or more output rectifier/filters 28; and a control amplifier 30 which receives a sample of the output as an input from either the power sine wave oscillator 24 or the output rectifier/filter 28 and controls the power sine wave oscillator 24 to provide a constant output by comparing the sample to an internal or external control or reference.

The output rectifier/filter 28 can take numerous forms. For example, it could be a simple rectifier and capacitivite filter for a DC application, or it could be a direct connection to the output of the transformer in the case of driving a CFD (compact fluorescent discharge) tube as used on computer and TV blacklight displays. Alternatively, the output rectifier/filter 28 can be a multiplier 162 for a HV (high voltage) application such as described below with respect to FIGS. 5-8B. There may be multiple outputs from the transformer in the form of multiple secondary windings, each of which can be used with an output rectifier to provide a plurality of outputs.

The control amplifier 30 compares a sample of the output of either the power sine wave oscillator 24 or the output rectifier/filter 28 to a reference voltage. The control amplifier 30 via appropriate feedback conditioning generates the control signal for the controlled current source which is discussed below with respect to FIGS. 2 & 3, thereby accurately regulating the output of the supply against load and other changes. The control is configured such that if the output increases compared to the reference, the drive signal is reduced, and conversely if the output falls compared to the reference, the drive is increased, thereby assuring precise control of the output despite changes in load or source power to the supply.

The individual parts within the component 22 can vary depending upon the specific application of the power supply 20. In addition, additional components 22 can be added as explained in further detail with respect to FIG. 6.

Figure 2:
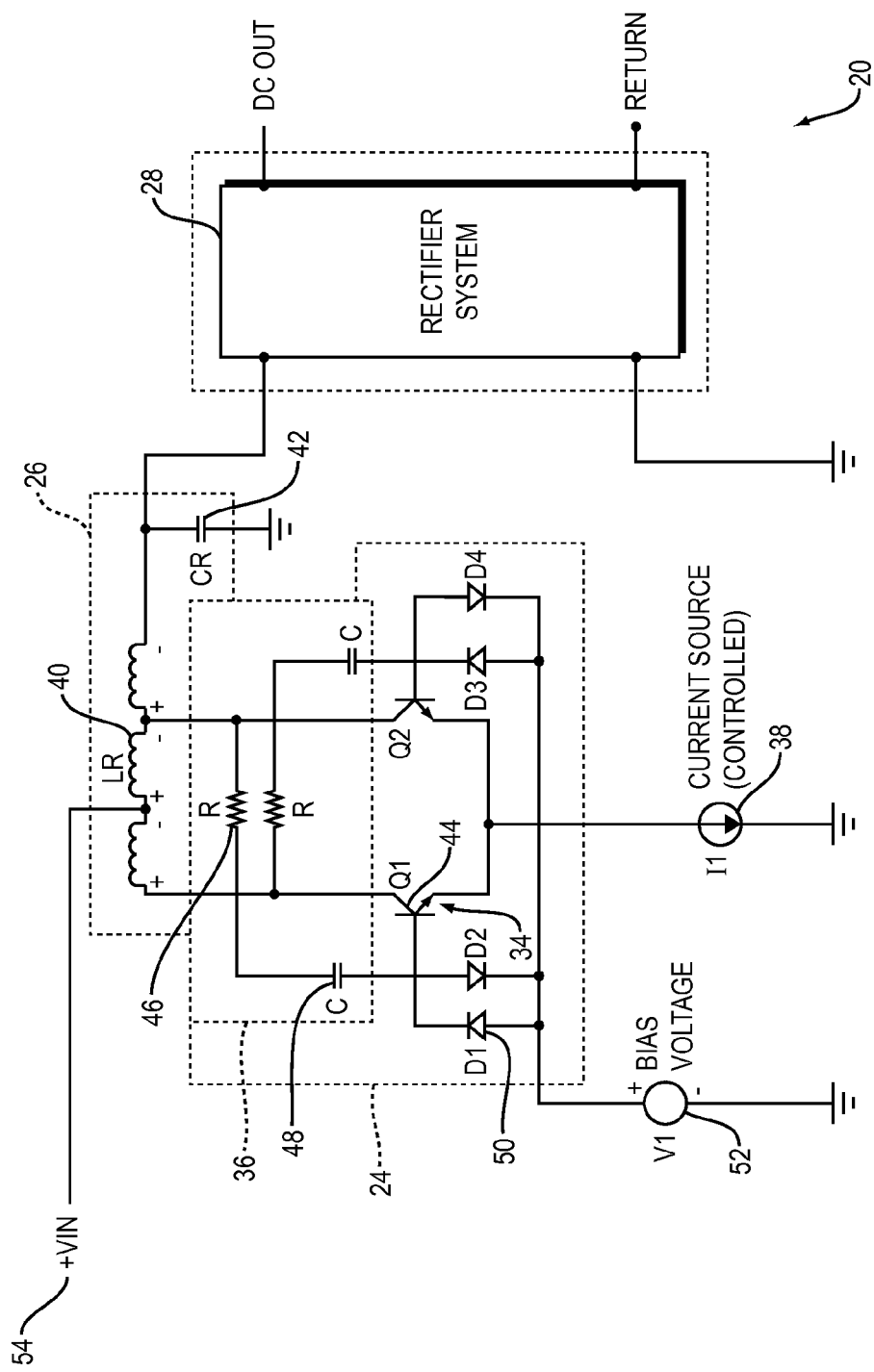
FIG. 2 is a schematic of the power supply system of FIG. 1.

Referring to FIG. 2, a schematic of the power supply system 20 of FIG. 1 is shown. The power sine wave oscillator 24 consists of a phase shifted differential amplifier 34 with a differential feedback 36 driven by a constant current source 38. The differential feedback 36 can be configured in at least two possible ways, depending upon tradeoffs between acceptable noise and efficiency.

The system 20 includes the resonant tank, the transformer 26, consisting of inductors 40 and capacitors 42. The phase shifted differential amplifier 34 has a pair of differential drivers, transistors Q1 and Q2 44 and the differential feedback network 36 consisting of a resistor 46 and a capacitor 48 in series. The phase shifted differential amplifier 34 of the power sine wave oscillator 24 is controlled by the current source 38. The phase shifted differential amplifier 34 input has a series of diodes 50 to clamp the input voltage to the differential amplifier to assure the necessary phase relation for maximizing the power oscillator efficiency. The current source is controlled to just replace the energy lost to the load and internal losses of the resonant tank and driver.

Still referring to FIG. 2, the system 20 has a reference voltage 52 for biasing the differential pair of the power sine wave oscillator 24. In addition, the main power source voltage 54 is inputted to the transformer 40 centertap. The transformer 40 is resonated with a capacitor. This may be a part in the design, or the effective capacity of the rectifier system 28. Typically in HV applications where the rectifier system 28 is a Cockcroft-Walton multiplier, the inherent capacity of the diodes in the multiplier provide the resonant capacitor for many applications.

Figure 3:
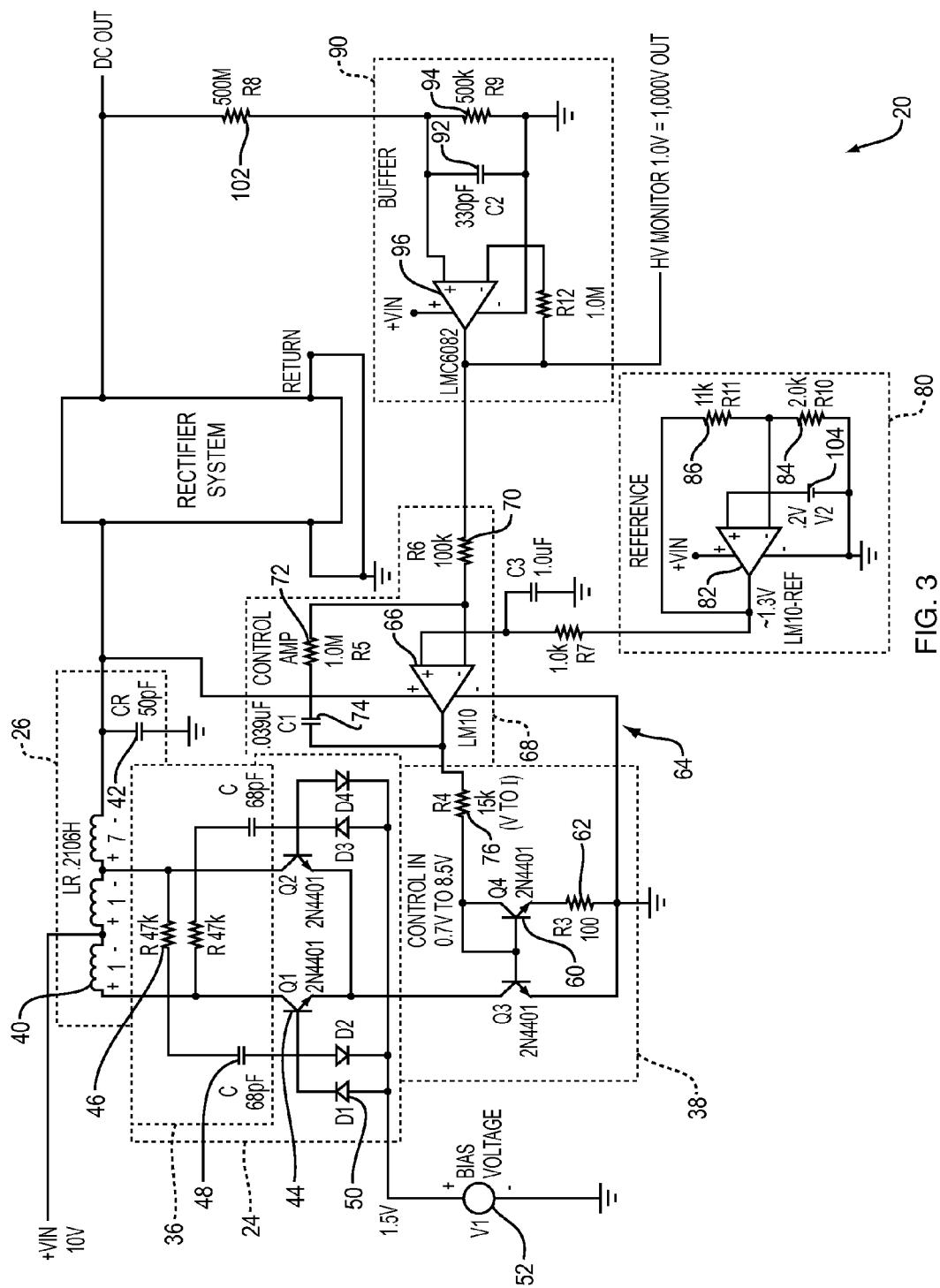
FIG. 3 is a schematic of the power supply system of FIG. 2 with additional details.

Referring to FIG. 3, a schematic of an implementation of the power supply of FIG. 2 with additional details is shown. The system 20 has the power sine wave oscillator 24 and the transformer 26 described above. FIG. 3 gives values or details for the inductors 40, the capacitors 42, the transistors 44, the resistors 46, and the capacitors 48. How the component values are calculated is discussed below.

The constant current source 38 drives the common emitters of the differential pair transistors 44. The constant current source 38 driving the resonant tank results in a highly linear relation between the drive and output voltage with a single pole characteristic so that the linearity of the design is not a major factor. Key design elements or features of the current source 38 are that the current source 38 has the lowest possible voltage drop, a large compliance range, and a least possible waste power.

In the embodiment shown, the constant current source 38 is a current mirror design with gain. The current source 38 has a pair of transistors 60 that are thermally coupled to minimize temperature sensitivity. In a current mirror, the current on the drive side is normally equal to that on the output side. In the embodiment shown in FIG. 3, a bias resistor 62 is added to the emitter leg of the bias transistor 60 to provide gain to reduce the total current, and therefore power.

Still referring to FIG. 3, the control loop 64 for the power supply 20 is designed reflecting that the power oscillator is current fed and linear in operation; control loops that would not work on a conventional system are possible. The load characteristic can itself be the dominant pole for the control loop 64. With the sine wave power oscillator 24, the transfer gain is linear and quite stable while the corner point moves over a range. Therefore, as long as the control loop does not have a pole in the range of the dominant output corner point variation, stable operation of the supply is possible as described.

The control loop 64 has a low power operational amplifier 96 which is part of a voltage sensing circuit 90. This samples the DC Out voltage from the HV rectifier system, scaling the voltage to a reference level, and buffering it with an operational amplifier 96. The output of amplifier 96 can be used as a monitor output. Note that the capacitor 92 is used to compensate for the intrinsic capacity of the high resistance sense resistor 102. The control amplifier or voltage sensing circuit 68 has an input resistor 70 connected to the operational amplifier 66, and is also connected to an output voltage feedback circuit 90. The control amplifier or voltage sensing circuit 68 has a resister 72 and a capacitor 74 in series to provide loop compensation, converting from an integrator to eliminate DC errors to a fixed gain at higher frequencies where the load characteristics dominate.

The control amplifier 30 part of the power supply system 20 has a reference voltage circuit 80 including an amplifier 82. The reference voltage circuit 80 has a reference resistor 84 and a feedback resistor 86 to scale the low fixed reference voltage to the desired reference voltage.

Still referring to FIG. 3, the power supply system 20 has the output voltage feedback circuit 90, which includes a capacitor 92 and a resistor 94 in parallel for assuring the divider characteristics are constant over the control frequency range. In addition the output voltage feedback circuit 90 has a buffer 96.

The use of the load characteristic as the dominant pole is usually not practical for switching supplies, as the conversion gain varies in a non-linear fashion depending upon the current operating point, which is a function of supply load, input voltage, thermal state and other factors even with the newer current mode controllers. These would result in large dynamic loop gain variations for a fixed output voltage, which would make designing a stable supply using the load response impossible.

For a power supply system 20, the values of components and output such as capacitors and resistor and power and voltage, and the resonant operating frequency are chosen to provide the necessary power handling, with the restrictions of inherent minimal resonant capacity in Cockcroft-Walton multipliers, acceptable transformer losses, and other factors. Note that constraints from these other factors means that not all combinations of values are possible.

Figure 7:
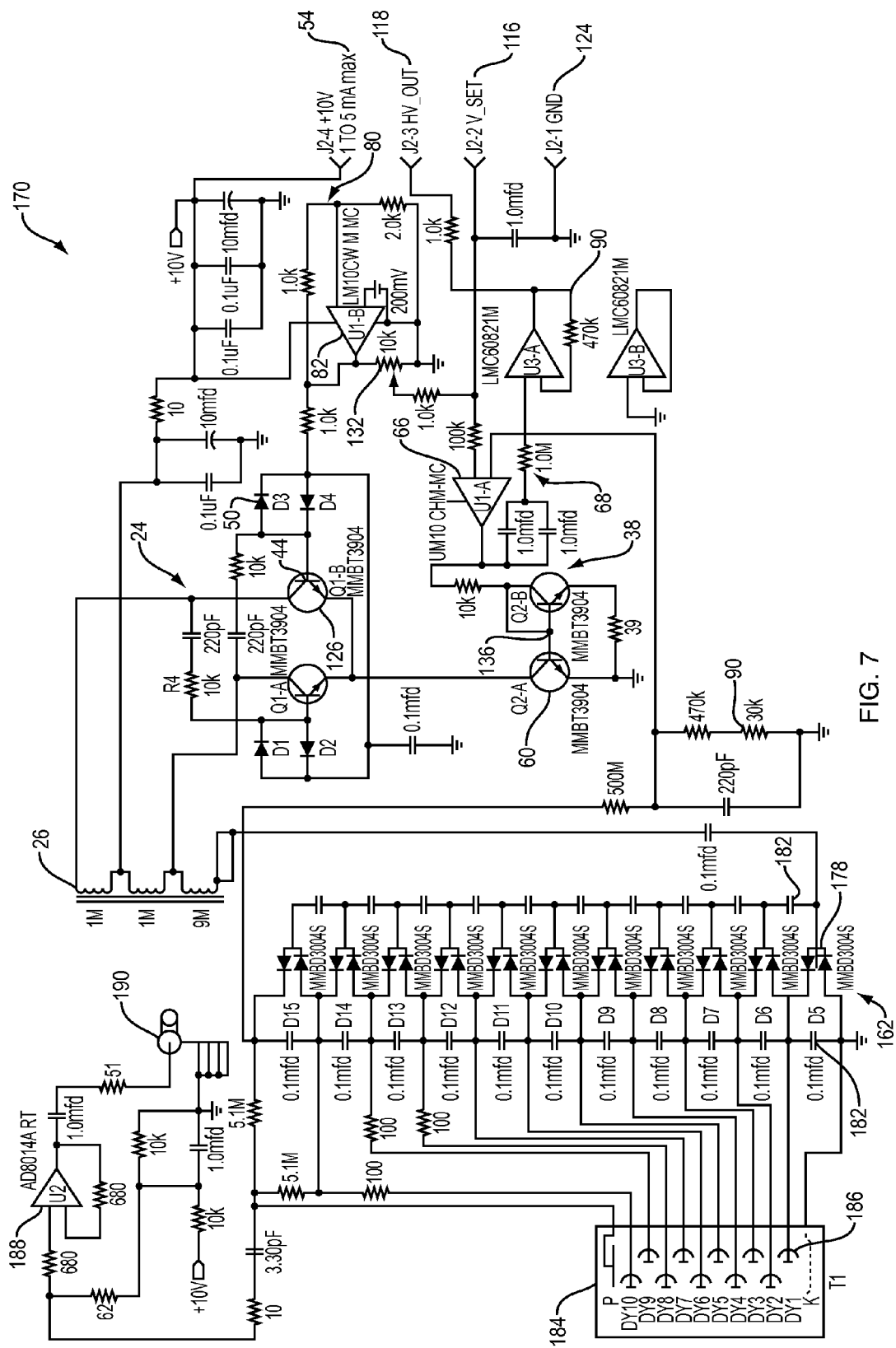
FIG. 7 is a circuit diagram of a Preamp and High Voltage Power supply system according to the invention.

The following is an example of determining values for a power supply system 20. Still referring to FIG. 3, the values shown are an example where the power supply system 20 is used with a Walton-Cockcroft multiplier, as seen in FIG. 7, having two diodes 178 per stage. The multiplier 162 in this embodiment is for use with a ten (10) stage PMT and thus the multiplier 162 would require at least 10 stages to provide the necessary voltages. Thus, at least 20 diodes would be required for the multiplier. These diodes 178 form the CR capacitor of the resonant circuit, and a suitable high voltage diode would typically have about 2 pF of capacity per diode. Thus, the total resonant capacity would be about 20*2 pF=40 pF. This forms the minimum capacity of the design, plus whatever parasitic capacity is present in the Resonant Inductance (LR) tapped inductor or transformer 26. Thus, an estimated total Resonant Capacity (CR) would be about 50 pF. This results in a maximum possible resonant frequency and power.

To determine the other design values, some standard equations of resonant systems are useful and are listed below.

$$Xt = \sqrt{\frac{LR}{CR}} \quad fr = \frac{1}{2\pi\sqrt{LR \cdot CR}} \quad Q = \frac{Xt}{Rs} = \frac{Rp}{Xt}$$

$$Pt = \frac{V^2}{2\pi \cdot LR \cdot fr} = V^2 \cdot 2\pi \cdot CR \cdot fr \quad Q = \frac{Pt}{Pl}$$

Where:

Xt=Resonant Tank Impedance (ohms)

LR=Resonant Inductance [effective] (Henries)

CR=Resonant Capacity [effective] (Farads)

fr=Resonant frequency (hertz)

Q=Resonant Tank quality factor

Rs=Resonant tank effective series resistance

Rp=Resonant tank effective parallel resistance

V=RMS tank voltage

Pt=Total stored resonant tank power per cycle (energy)

Pl=Total lost resonant tank power per cycle (energy)

Continuing on in determining values of components 22 in this embodiment, the next issue is what is the maximum voltage required at the output of the tank, and at what power. In the case of the PMT, the maximum required operating voltage might be 1,250 volts, and the multiplier was defined as having 10 stages, so the peak-to-peak voltage at the output of the transformer would be 125 volts. The RMS voltage is $1/\sqrt{2}$ times the peak voltage, or $125/2 \cdot 1/\sqrt{2} = 44.2$ VRMS.

Figure 5:
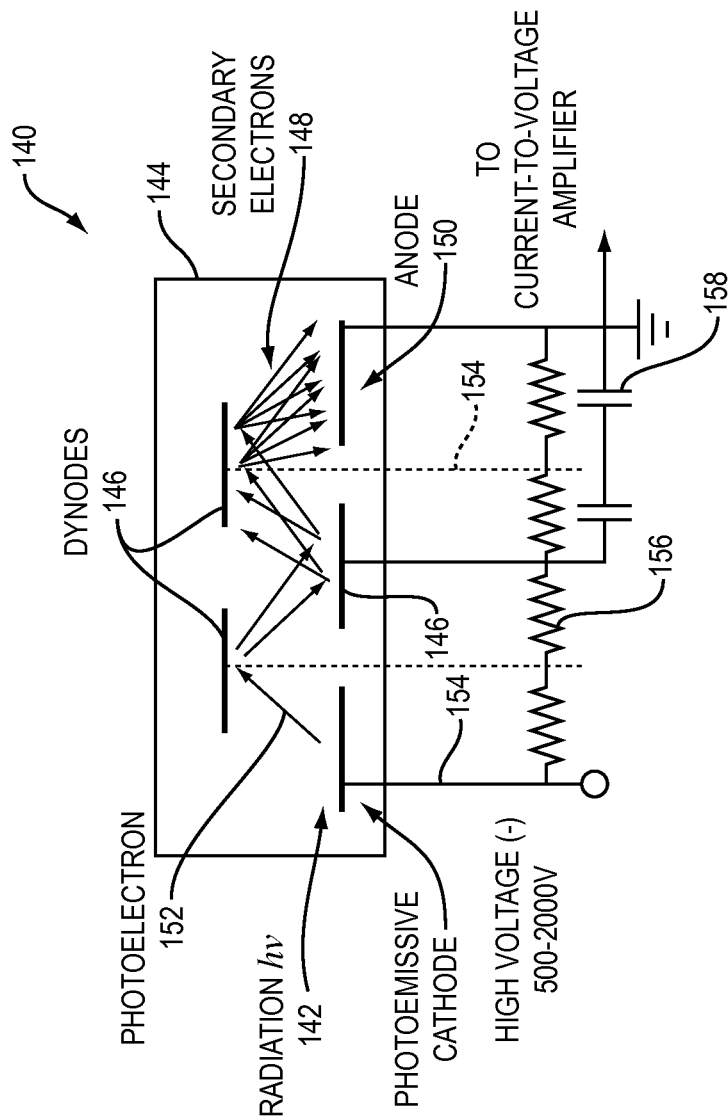
FIG. 5 is a schematic of a photomultiplier tube.

The required output power is then calculated. For an initial calculation, the maximum power for the tube 140, as seen in FIG. 5, is assumed to be defined by the rated maximum average current for the tube, which is typically 100 uA at the plate of the PMT 140. A simplistic approach would be to assume that the power would be the maximum average current times the full tube voltage. In this example it would be 1,250V*100 uA, or 125 mW.

While a possible design value, it would provide substantially too much power, and would be excessive for the tube. The current for each dynode varies as the overall output gain for a PMT, which is typically $10^6$. With 10 stages, this means the gain per stage is $(Gs)^{10}=10^6$, so Gs=3.98, or about 4.0. Thus, a good estimate for the tube power is $$\frac{1,250}{10} \cdot \sum_{n=0}^{n=10} 100uA \cdot \left(\left(\frac{1}{4}\right)^n\right).$$

At limit, this is less than $$\frac{1,250}{10} \cdot 100 uA \cdot 2 \leq 25 \text{ mW},$$

or about $\frac{1}{5}^{th}$ of the previous estimate.

The other load is from the HV feedback resistor 102, which in a typical design might be 500 MΩ, in FIG. 3, so the power dissipated would be about $$\frac{1,250^2}{500 \times 10^6} = 3.1 \text{ mW}.$$

Assuming full current across the diodes, and the diode forward voltage drop is about 2.0 volts, the diode losses might be another 2 mW, so that the total power losses at full load other than transformer losses would be ~25 mW+3.1 mW+2 mW=30.1 mW.

Continuing to determine values of components 22 of the system 20 as shown in FIG. 3, from the previous paragraph the total power for the load needs to be about 30.1 mW, and the power oscillator will operate with an effective Q below 1. Thus, a good design starting value is with the Q equal to unity, that is the maximum output power is equal to that stored in the resonant tank 26. As discussed above, the minimum tank capacity 42 will be about 50 pF, and the maximum power stored in the resonant tank as 30.1 mW, the maximum tank inductance can be calculated. That is:

$$P = V^2 \cdot 2\pi \cdot CR \cdot fr = 0.0301 = 44.2^2 \cdot 2\pi \cdot 50 \times 10^{-12} \cdot fr$$

Thus, the resonant frequency fr can be solved for, as fr=49,042 hertz. Knowing the frequency and the other parameters, the inductance can be calculated from:

$$LR = \frac{V^2}{2\pi \cdot fr \cdot Pt} = \frac{(44.2)^2}{2\pi \cdot 49,042 \cdot .0301} = .2106 \text{ H}$$

(See ref. no 40 in FIG. 3)

As a check, these values can be used in the resonant formula to verify the fr:

$$fr = \frac{1}{2\pi\sqrt{CR \cdot LR}} = \frac{1}{2\pi\sqrt{50 \times 10^{-12} \cdot .2106}} = 49,042 htz$$

Thus, the resonant tank is determined for the inductor design, and selecting the core materials, etc. In addition, the tank impedance is defined by $$Xt = \sqrt{\frac{LR}{CR}} = \sqrt{\frac{.2106}{50 \times 10^{-12}}} = 64,899 \text{ ohms}.$$

This permits calculating the RMS current in the tank as 44.2V/64,899 ohms=681 uA.

The transformer turns ratio can be determined for the inductor design by noting that the peak voltage is 62.5 volts. If the planned power supply is 10 volts, some voltage needs to be allowed for the bias voltage and the constant current source. A nominal value is to allow for 2 diode drops of 0.75 volts, or about 1.5 volts. Thus, the available voltage swing for the collectors is about 10–2.5 volts, or 8.5 volts. Thus, the approximate turns ratio is given by 62.5/8.5 volts, or 7.35:1. Typically, the next integer value is selected so the ratio would be 8:1. With this selection and the secondary current calculated before of about 681 uA, the RMS primary current would be about 8*0.000681=5.4 mA. This selection completes the complete resonate tank 26 parameter designs, and the rest of the power oscillator design can be completed for the values of the differential feedback based upon the operating voltages and currents.

In normal full power operation at full voltage, the voltage across the transistors is given by the RMS voltage and currents. Thus, the power in the differential driver transistors would be given by:

(10.0V−0.7V−44.2/8V)*(5.4 mA)*½=(3.7)*(0.0054)
 *(½)=10.2 mW

In overload condition, the output would be shorted, so that there would be no oscillation, the power would be (10.0V−0.7V)*(5.4 mA)*(½)=25.1 mW, so most any general purpose transistor would be suitable, since even the smallest parts are rated for powers over 100 mW.

In this example, the general purpose transistor 44 selected was a 2N4401 part, which is rated for up to 350 mW. The next part of the design is to calculate the differential feedback 36 component values for the resistors 46 and the capacitors 48. One of the key issues of this design is this bias. The design criteria needs to maximize the efficiency and assure self-starting. In typical oscillator feedback, the drive is adding power to the resonant tank 26 while the sensed voltage across the tank or current through the tank is above the median value. While this works, it means that power is injected into the tank that is both building up the tank energy while the voltage (current) in increasing in the tank and then while the voltage (current) is decreasing as well, effectively wasting some of the drive power and forcing the frequency to be shifted from the ideal resonant value.

Consequently, with this design approach, the drive current is delayed so that the drive current is applied to help the voltage swing, thereby maintaining a better phase match to the tank current, increasing the efficiency. This is accomplished by selecting the RC time constant such that the pole frequency is in the range of equal to twice the nominal resonant frequency. Where in this range the pole frequency is selected is guided by the characteristics of the application and the resonant inductor or transformer.

The primary consideration is due to the transformer 26 turns ratio and associated parasitics that result in the self-resonant frequency. The power oscillator does not have a nominal limit of frequency operation other than that determined by the $f_\alpha$ of the transistor, which is typically very high and above the inductor or transformer self-resonance.

For example, for the 2N4401 (the transistor 44 in FIG. 3) the $f_\alpha$ is in the range of 250 to 500 mHz, depending upon collector current. Thus, the power supply system 20 will oscillate at the self-resonance of the transformer 26 rather than the desired fr if that is the predominant resonance in the design. Thus, for transformers and inductors with a large number of turns and/or a high turns ratio, this is a potential problem. It is aggravated at start-up with a rectifier that provides an effective short at the output, so that the load diode capacity is not seen. If the self-resonance is sufficiently high relative to the design fr, then the transformer or inductor may not be capable of transferring sufficient energy to the output to charge the load capacitors, with the result that the system can never get out of the transformer/inductor self-resonant mode to the designed power transfer mode at lower frequency.

There are several approaches to deal with this. This problem typically occurs with very high turns ratio transformers or inductors with the resonant capacitors are located at the output of the secondary and are the diode parasitic capacity. Adding a capacitor across the primary that is a small portion of the nominal reflected secondary capacity can lower the transformer/inductor self resonance sufficiently so that enough power is coupled to the output that a normal operation ensues after a transient period of operation in the self-resonance mode. In one embodiment, the location of the additional capacitor is across the center tapped primary of the transformer (between the collectors of Q1 and Q2).

The self-resonance of the transformer can affect the design of the bias resistor 46 and capacitor 48 in that if a high turns ratio transformer is required with a high number of turns is required, then the RC time constant should be chosen equal to the design fr of the system. If a low turns ratio and relatively low total turns are required, then the RC time constant is selected that is two or three times higher than the nominal self resonance fr of the system. In general, if the transformer/inductor self-resonance is 20 to 100 times higher than the nominal fr, then a higher RC time constant is appropriate. If less than 20 an RC equal to the nominal fr is used, and if it is less than 10, a primary capacitor may be required to assure reliable starting of the oscillator.

The selection of values is quite straightforward. With the resonant frequency of the tank determined, look at the minimum β of the sine wave oscillator transistors at the RMS collector current. In this case, that is a frequency of 49 kHz and a collector RMS current of 5.4 mA. At these values, the 2N4401 data sheet indicates a minimum β of 75. Thus, the required base current will be ~5.4 mA/75=72 uA. From the earlier calculations, the RMS voltage at the collector will be 44.2V/8 Turns=5.5 volts, which corresponds to an impedance of about 76,736 ohms. Thus, the RC reactance at the selected frequency should be less than 78 kohm. For an RC circuit, the series impedance is the square root of the sum of the squares of the individual reactance's, so that each impedance should be about equal to $$\frac{1}{\sqrt{2}} \cdot X_{RC},$$

or 0.707*76 kohm=54 kohm. The nearest standard value is 47 kohm, so for this example, the value of the bias resistors 46 is 47 kohm.

Since the transformer has a relatively high turns ratio of 8 and the very highest efficiency is not indicated, the RC constant can be chosen equal to the nominal resonant frequency of 49 kHz. Thus, the value of the capacitor 48 can be found as:

$$C = \frac{1}{2\pi \cdot R \cdot fr} = \frac{1}{2\pi \cdot 47,000 \cdot 49,000} = 69 \times 10^{-12} \text{ or } 69 \text{ pF}$$

The nearest standard value is 68 pF, so that completes the design of the sine wave power oscillator circuit 24, as shown in FIG. 3 schematic.

The next portion of the design is the current drive to the common emitters of the differential pair. Any standard current source design could be used. Since the current source 38 is in a feedback loop, the linearity of the design is not particularly important, but the lowest possible voltage drop and large compliance range is important, as well as the least possible waste power. Consequently, a standard current mirror design with gain is used, as shown in FIG. 3.

A single transistor 60 in a common emitter configuration could be used, but it would have very high temperature sensitivity, and since an emitter degeneration resistor would typically be required, it would have a significant voltage drop. The temperature sensitivity would not be a big issue while in regulation, but if current limit mode (overloaded), the current limit could vary over a large range as the unit self-heated, with the current increasing as the temperature increased, with a possible thermal run-away.

The current mirror, on the other hand, would tend to maintain a relatively stable current due to the thermal coupling of transistor Q3 and Q4, 60. If a dual transistor 60 were chosen for Q3 and Q4, the variation could be minimized.

In a nominal current mirror, the current on the drive side is equal to that on the output side. However, a bias resistor R3 62 is added in the transistor Q4 60 bias device emitter, this increases the drive to the transistor power device, Q3. For a silicon device at constant temperature, the $V_{be}$ increases by 59.6 mV per decade of current in the device, per the Ebers-Moll model of a junction. Thus the current mirror can be designed to provide a current gain of a factor of 10 by simply adding a resistor R3 62 sized so that at the maximum input control current it has a drop of ~60 mV.

This has the design advantage of simplicity, and the compliance of the current source is maximized from the saturation voltage of the transistor Q3 60 to the supply voltage. In the current design example, the maximum design current out of the mirror would be 5.4 mA, so the input drive current would be 0.54 mA. To generate the 0.060 volt drop would require a resistor equal to 0.060/0.00054=110 ohms. Thus, for this example, the current source gain resistor 62 would be selected as 100 ohms to allow for a little drive margin.

Assuming the constant current source 38 is driven from an op-amp across the input power and the power supply is 10 volts, then the maximum drive voltage that can be assumed is the supply voltage minus the amplifier saturation voltage, which is typically about two diode drops, or 1.5 volts. Thus, the maximum drive voltage would be 8.5 volts. The current mirror input voltage would just be the $V_{be}$ of the 2N4401 power handing device, which can be estimated from the 2N4401 specification sheet as 0.7 volts, so that 8.5−0.7=7.8 volts. Thus, the input conversion resistor R4 76 can be calculated as 7.8V/0.54 mA=14.4 kohm. The nearest standard value is 15 kohm, so that would be tentatively selected. If when testing the supply there was insufficient drive to maintain the full output voltage at full load current, then value of this resistor 76 would be reduced to increase the drive.

To complete the power supply system 20, the values of the control loop 64 include the feedback loop. With the single pole character of the sine wave oscillator with the single pole transfer characteristic, most standard control approach will work, with the understanding of the dynamics of the cell. For this example, it will have similar characteristics as any inverter using the Cockcroft-Walton multiplier stack, that is the time constant of the output is not constant but rather a function of the drive current and the load. Consequently, the fundamental one pole characteristic of the load varies over the range defined by the minimum load (presumably the feedback sense resistor) and the maximum load at the output.

Thus, the supply time constant varies by the range of the output current. For the sample supply, the design is for a maximum output current to match that of the PMT 140, which is about 100 uA on the bottom stage. The minimum current would be that of the feedback voltage sensing divider, which would typically be chosen to be about 2 uA, high enough to minimize errors due to leakage but low enough to keep the overall supply efficiency high. This is a 50 to 1 variation in the supply output time constant. With the power sine wave supply 20, the conversion characteristic is linear, so that much of the complications of a conventional supply are avoided. This is clearly a moving target for compensation, which with a conventional design would be to choose the corner points so that they are a factor of three to an order of magnitude higher than the varying load parameters.

However, since the power oscillator power supply 20 is current fed, and linear in its operation unlike the behavior of typical switching supplies, there is an alternate approach possible. That is, the load characteristic itself can be used as the dominant pole for the control loop. This is not practical for switching supplies, as the conversion gain varies in a non-linear fashion depending upon the current operating point, which is a function of supply load, input voltage, thermal state, and other factors. These would result in a large dynamic loop gain variations for a fixed output voltage, which would make designing a stable supply using the load response impossible.

However, with the sine wave power oscillator 24, the transfer gain is linear and quite stable while the corner point moves over the 50:1 range. Thus, as long as the control loop does not have a pole in the range of the dominant output corner point variation, it is quite possible to design a stable supply. Further, the response of the design will be the maximum possible with the given dynamic conditions, increasing with increasing load and decreasing as the load decreases. In short, the performance will vary depending upon the load conditions.

In the embodiment shown in FIG. 3, for use with Walton-Cockcroft multiplier 162 as discussed above, the response of the system 20 needs to be identified. The first is to identify the response of the system 20. The multiplier stack is assumed to have 10 stages, and the capacity per stage is assumed 0.1 uF, with a maximum voltage of 125 volts per stage. As noted above, the maximum current in the stage is designed to be about 100 uA. At 125 volts, this is equivalent to a resistance of $$\frac{125}{100 \times 10^{-6}} = 1.25 \times 10^6 \text{ ohms.}$$

Thus, with the 0.1 uF capacitor this is a time constant τ of 0.125 seconds, or a frequency of 1.27 hertz. With the power oscillator 24 operating at about 50 kHz and a maximum Q of about 10, the oscillator corner point will occur at about 5.0 kHz, so as long as the control circuit corner points are chosen such that the loop unity gain frequency is below about 2.5 kHz, the system will be stable.

That is, the multiplier pole will vary between a very low value and 1.27 hertz, with a maximum 90° phase lag at about 10 times that frequency or about 12.7 hertz, with the gain decreasing by half for each octave above that corner point. Thus, if the loop is closed with an integrator to eliminate static errors, it would need to have a zero at about 10 hertz, and a high frequency gain of less than 2,500/13=192, assuming there are no other poles in the system. However, since the high voltage sense divider typically has some parasitic capacity and coupling that injects noise into the loop and can add unexpected poles and zeros into the system, a good general compromise is to use a high frequency gain of 10, which can be trimmed later to enhance the supply transient performance if necessary.

In the current design, low power is desirable, so the feedback and voltage reference need to be chosen as low power parts. Since high value resistors and feedback networks are typical in such high voltage designs, operational amplifiers with very high input impedance and exceptionally low input bias currents are needed, although as can be seen from the loop characteristics analysis above, only a low to moderate bandwidth is required.

The National Semiconductor LM10AH (the operational amplifier 66) is a good choice for the design, with the added advantage of a single compact package that incorporates a low power operational amplifier and a precision band-gap voltage reference suitable for such designs, with a wide power supply range from a couple of volts to 40 volts.

The LM10AH (the operational amplifier 66) has a quiescent current of less than one mA, providing a very low minimum operating current. With this choice, the next item of the design is to determine the necessary loop constants.

Above, the dominant pole was determined as varying from a very low frequency up to about 1.27 hertz. The gain is somewhat more difficult to calculate, since it is load dependant. However, a good approximation for the power oscillator is to assume the full voltage output of 1,250 volts when driven at the maximum current, or a voltage level of about 8.5 volts. Then the power oscillator minimum gain is about 1,250/8.5=147 minimum, and given a load variation of about 50:1, the maximum (with no load) would be about 50*147=7,352. The next part of the system 20 in which to determine values is the voltage sensing circuit 68. If the control characteristic desired is 1V of control voltage yields 1,000V out of the supply, then the attenuation would be 0.001, so the overall gain through the power oscillator and attenuator would be from about 0.147 to 7.352 with a dominant pole that varies from about 0.026 to 1.27 hertz. Above, the maximum high frequency gain was calculated to be about 192, so that if the maximum power inverter gain is about 7.352, then the maximum feedback amplifier gain should be about 192/7.352=26. To allow some margin of safety for this calculation, a value of somewhat less than ½ is chosen, or a gain of 10.

With these values, the loop gain with a single corner point will be at unity at about 7.3*10*1.3 Htz, or 95 hertz, down to about 2 hertz, so that the pole should be located at about 9.5 hertz. These values define the design of the feedback amplifier. Assuming an inverting amplifier to realize an integrator, and the input resistor 70 is 100K, and then the feedback element will be a series connection of a resistor 72 and capacitor 74. The feedback resistor 72 will have to be 1.0 Megohm to provide the high frequency gain of 10, and the capacitor 74 will have to be a 0.039 uF so that the corner frequency where the integrator converts to an amplifier will be at 9.5 hertz. The resistive divider would be realized with a 500 Meg HV resistor 102 from the multiplier output to a 500K resistor 94 at the bottom of the divider, to provide the attenuation of 0.001.

This should provide a stable loop with minimum transient overshoot, and the fastest practical settling time determined by the effective operating load. The last part of the sample design is the reference, and that is supplied by the LM10AH 82. That has a fixed reference voltage of 0.2 volts 104 from the band gap reference. Thus with a desired control range up to 1,250 volts out, or a 1.250 volt reference, the nominal reference voltage needs to be 1.250 volts, or 1.250/0.2=6.25 times the reference. If the reference resistor 84 from the inverting input of the reference amplifier is chosen as 2.0K, then the feedback resistor 86 should be 10.5K to provide the 6.25 ratio. If 5% parts are used, the nearest larger value is 11.0K, which will provide a maximum voltage of about 1.30 volts, allowing a slight over-range to account for tolerance buildup.

An additional advantage is that this voltage is appropriate to use for the power oscillator bias voltage, being slightly greater than the Vbe of the differential pair (~0.7 volts) and the saturation voltage of the controlled current source (~0.2 volts) or 0.9 volts, saving the parts for an additional divider, and having the advantage of not varying with the power supply voltage. In this manner, the entire +1,250 HV supply is realized, in a very small profile, low parts count configuration that approximates an ideal conversion module. The supply 20 will have no input noise or transients due to the constant current drive, and a very low noise output due to the pure sine wave internal operating frequency with very low harmonic content. The output ripple will be very small due to the large value capacitors in the multiplier stack, and slow diode switching due to the sine wave drive. As noted in the process of the design, the supply is inherently short circuit protected due to the limited range of the constant current drive, at very close to the normal maximum output of the supply. Furthermore, since the transformer or resonate inductor is operating as a transformer, the maximum output voltage the supply can provide is limited by the supply voltage, the turns ratio of the transformer primary to secondary output and the multiplier factor, so no additional circuits such as a snubber are required to limit fly-back surges typical with switching supplies. Also, since the current drive to the supply is inherently limited by the controlled current source, no additional current limit circuits are required.

Note that for the output voltage feedback circuit 90, there is a 330 pF capacitor 92 across the 500K bottom resistor 94. This is included to assure that the divider characteristics over the control frequency range are constant. Its function is the same as that of the compensation capacitor used on oscilloscope probes to compensate for the parasitic capacity across the large value 500M resistor 102. This is typically about 0.33 pF, so the compensating capacitor needs to be about 1,000 times the value, or a 330 pF capacitor to assure a flat response over the operating range. Note that without the compensation capacitor 92, the feedback attenuator would have a zero at about 1,000 hertz; close enough to the operating bandwidth of the control loop to degrade the transient performance of the supply.

The buffer 96 on the output of the output HV divider prevents the input impedance of the Control Amp, the voltage sensing circuit 68, from loading the divider, and changing the compensation of the control loop. The buffered output can be used as a monitor on the achieved HV output, with 1,000:1 scaling. The National Semiconductor LMC6082 part is a suitable choice, as it is very low power, has exceptionally low input currents and offsets, and rail-to-rail operation.

If a negative supply is needed, it can be easily achieved by reversing the polarity of the diodes 178, as seen in FIG. 7, in the multiplier stack and modifying the buffer 96 to an inverting buffer between the divider output and the LM10AH 66 inverting input.

Figure 4:
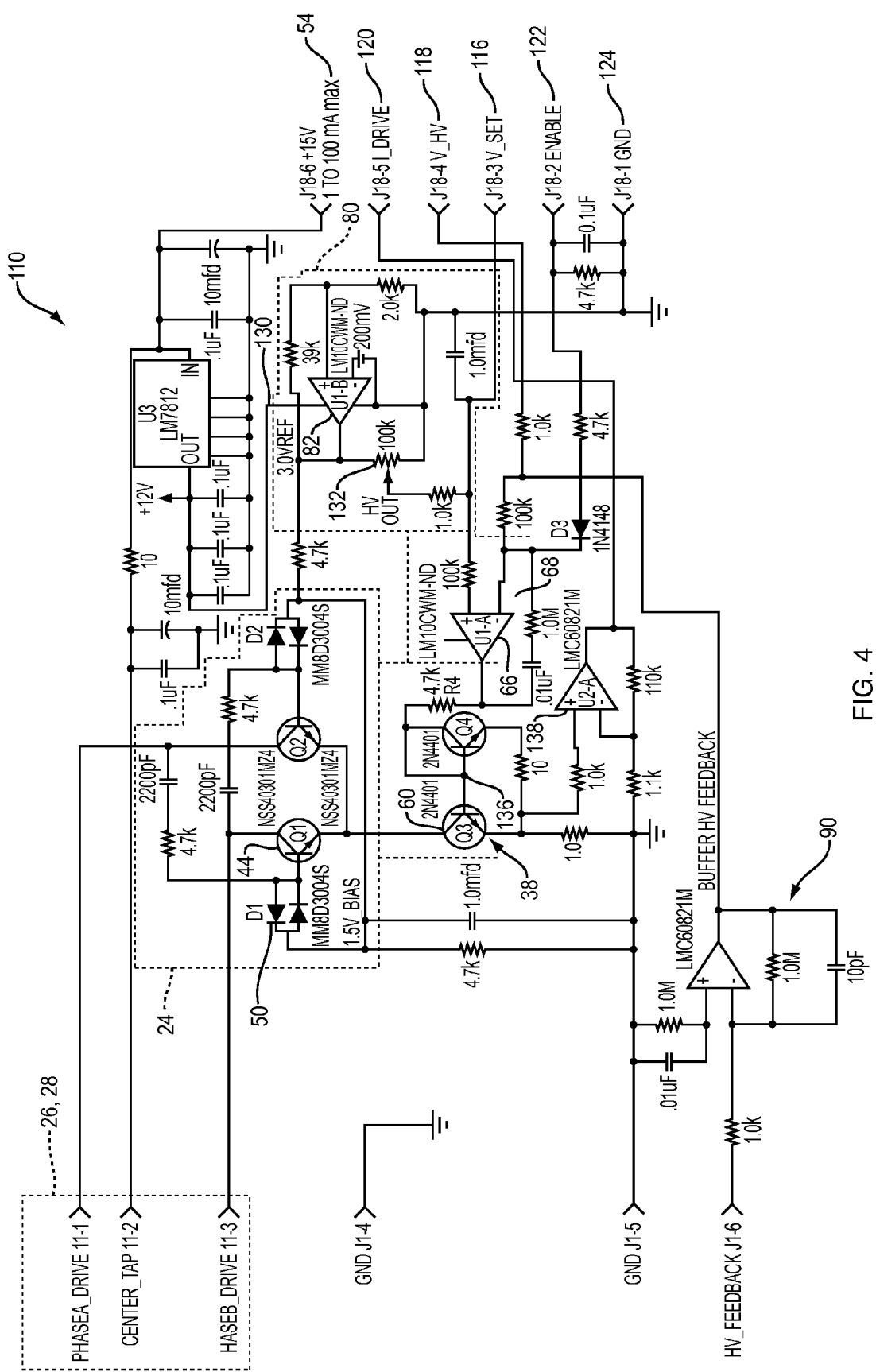
FIG. 4 is a circuit diagram of a high voltage supply system according to the invention.

Referring to FIG. 4, a circuit diagram of a −10 to −30 KV HV Power Supply controller system 110 is shown, without the transformer and rectifier system. The transformer 26 and rectifier system 28 are represented by the phantom box.

In describing the system 110 reference will be made to the circuits described above with respect to FIGS. 2 & 3 and certain components will be discussed. Not all the components will be discussed; one skilled in the art will be able to discern components from the diagram of FIG. 4.

The system 110 has the interfaces of an input voltage 54, a control 116, the voltage set, a high voltage out 118, a current drive, I-drive, 120, an enable input 122, and a ground 124.

The power supply system 110 has a reference voltage circuit 80 for receiving an input voltage 54 and a control 116, such as a second voltage, for generating/setting the output reference voltage 130. The reference voltage circuit's 80 primary components are an operational amplifier 82 and a potentiometer 130. The potentiometer 130 is adjustable with a mechanical device. The output voltage of the system 110 can be set with the potentiometer 130 or by varying the voltage of the control 116.

The sine wave power oscillator circuit 24 of the system 110 is connected to the reference voltage circuit 80. The sine wave power oscillator circuit 24 generates an alternating current. The sine wave power oscillator circuit 24 uses a pair of transistors 44 in parallel and several diodes 50 to generate an alternating current.

The emitters of both of the transistors 44 of the sine wave power oscillator circuit 24 of the system 110 are connected to the controlled current source circuit 38. A pair of transistors 60 of the controlled current source circuit 38 have their bases 136 connected together and connected to the control amplifier circuit 68. The transistors 60 in the controlled current source circuit 38 are identical to each other.

Still referring to FIG. 4, in the system 110, the emitters of the transistors 60 are connected to an operational amplifier 138 through several resistors. The operational amplifier 138 is connected to the current drive 120.

As indicated above with respect to FIG. 3, the control amplifier circuit, voltage sensing circuit, 68 is connected to both the reference voltage circuit 80 and the controlled current source circuit 38. The control amplifier circuit 68 is connected to the enable input 122 in addition to resistors and a capacitor in the embodiment shown, has the operational amplifier 66.

The output voltage feedback circuit 90 of the system 110 is a buffer high voltage feedback circuit. The circuit 90 is a feedback loop to control the voltage of the output, as discussed above. The output voltage feedback circuit 90 is connected to the control amplifier circuit 68.

Referring to FIG. 5, a schematic of photomultiplier tube (PMT) 140 is shown. The tube 140 shown is a head-on design where light (radiation) 142 enters a clear glass tube 144. The PMT 140 has a plurality of electrodes 146, called dynodes, that are for creating an electron multiplier effect. Each dynode 146 is held at a more positive voltage than the previous dynode 146. Electrons or photoelectrons 148 leave the dynode 146 having the energy of the incoming photon, light energy, minus some work function of the dynode 146. As the electrons 148 move toward the first dynode 146, the electrons 148 are accelerated by the electric field and arrive with much greater energy. Upon striking the dynode 146, more low energy electrons 148 are emitted, and these electrons 148 in turn are accelerated toward the next dynode 146. The geometry of the dynode chain is such that a cascade occurs with an ever-increasing number of electrons 148 being produced at each stage. Finally, the electrons 148 reach an anode 150 of the PMT 140, where the accumulation of charge results in a sharp current pulse indicating the arrival of a photon 152 at the photocathode. The multiplication of electrons 148 by secondary emission allows the PMT 140 to measure low light intensities.

The PMT 140 needs multiple input voltages as represented by the series of leads 154 and interposed resistors 156. In addition, the PMT 140 shows a capacitor 158 in parallel with the resistor 156 between the later dynodes 146. The anode 150 is shown grounded.

Figure 6:
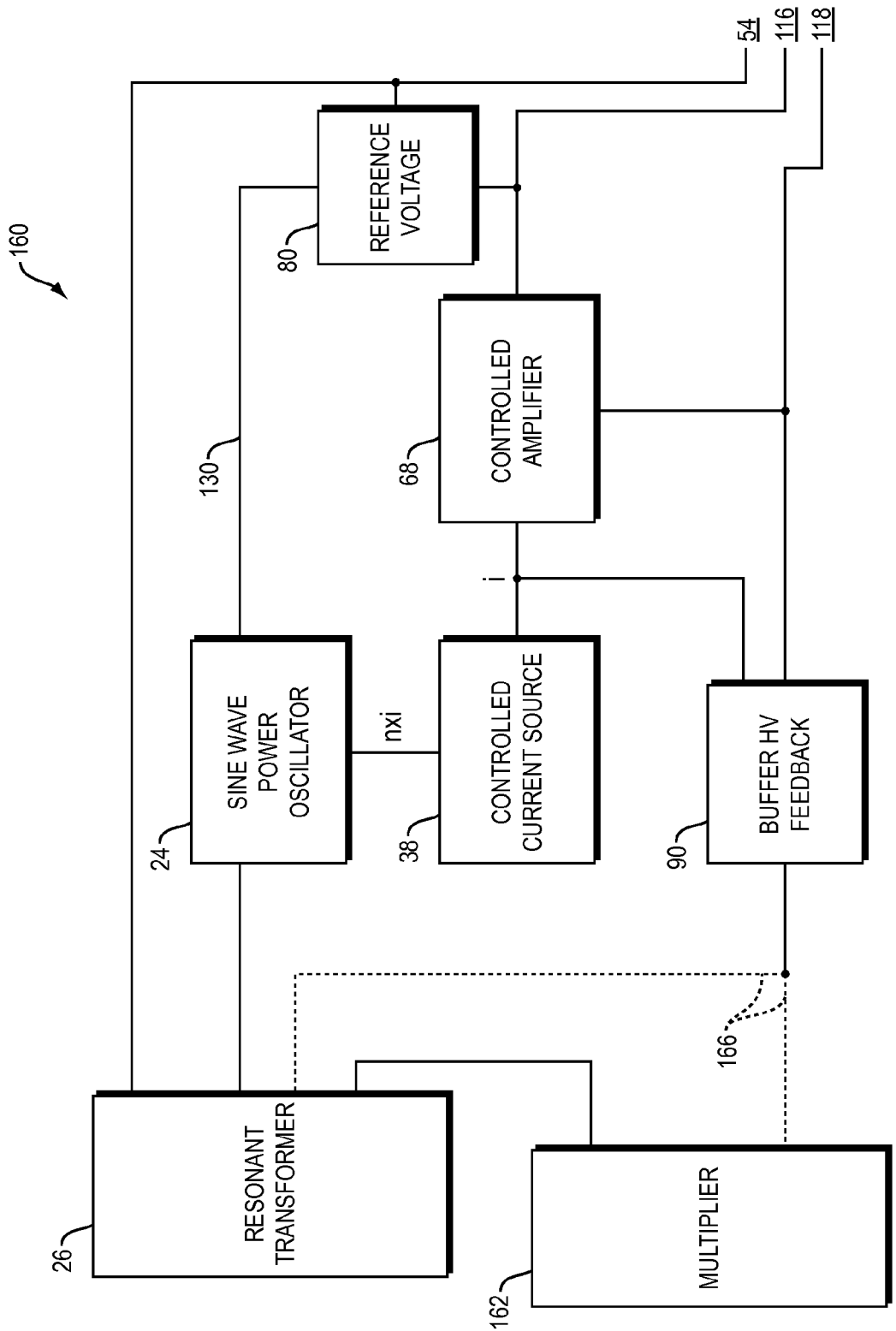
FIG. 6 is a block diagram of an alternative embodiment of the high power supply system according to the invention.

Referring to FIG. 6, a schematic of a power supply system 160 according to the invention is shown. The power supply system 160 has a reference voltage circuit 80 for receiving an input voltage 54 and a control 116, such as a second voltage. The reference voltage circuit 80 generates/sets the output reference voltage 130.

The system 160 has a sine wave power oscillator circuit 24 connected to the reference voltage circuit 80. The sine wave power oscillator circuit 24 generates an alternating current. The sine wave power oscillator circuit 24 of the system 160 is connected to a controlled current source circuit 38. The controlled current source circuit's 38 current level is set or determined by a control amplifier circuit 68 which is connected to both the reference voltage circuit 80 and the controlled current source circuit 38.

Still referring to FIG. 6, the system 160 has a resonant transformer 26 connected to the input voltage 54 and the sine wave power oscillator circuit 24. The resonant transformer 26, a form of a leakage transformer, uses the leakage inductance of its secondary windings in combination with external capacitors, to create one or more resonant circuits. The resonant transformer 26 is capable of generating very high voltages.

The system 160 in addition has a multiplier 162 with a series of taps, such as 16 taps. The multiplier 162 is connected to the secondary windings of the resonant transformer 26. The system 160 is capable of connecting to a device, such as the PMT 140 of FIG. 5, that requires various voltages.

Still referring to FIG. 6, the system has a buffer high voltage feedback circuit 90. The buffer high voltage feedback circuit 90 is a feedback loop to control the voltage of the output. The buffer high voltage feedback circuit 90 is connected to the control amplifier circuit 68. In addition, the buffer high voltage feedback circuit 90 is connected to a high voltage output 118 at the input or interface. In addition the buffer high voltage feedback circuit 90 is either connected directly to the multiplier 162 or the resonant transformer 26. Two phantom lines 166 represent the alternative connections.

Referring to FIG. 7, a circuit diagram of the Preamp and High Voltage Power supply system 170 is shown. The Preamp and High Voltage Power supply system 170 is particularly well suited for use with a specific PMT tube 140, where minimal power and size are the prime design considerations. The system 170 incorporates a low noise, high gain preamplifier as described below. The power supply 170 operates in close proximity to a very sensitive signal preamp with minimal or no noise contamination.

In describing the system 170 reference will be made to the circuits described above with respect to FIG. 6 and certain components will be discussed. Not all the components will be discussed; one skilled in the art will be able to discern components from the diagram of FIG. 7.

The system 170 has the input or interface of an input voltage 54, a control 116, the voltage set, and a high voltage out 118. In addition, the circuit has a ground 124, which will not be discussed in detail.

Figure 8A:
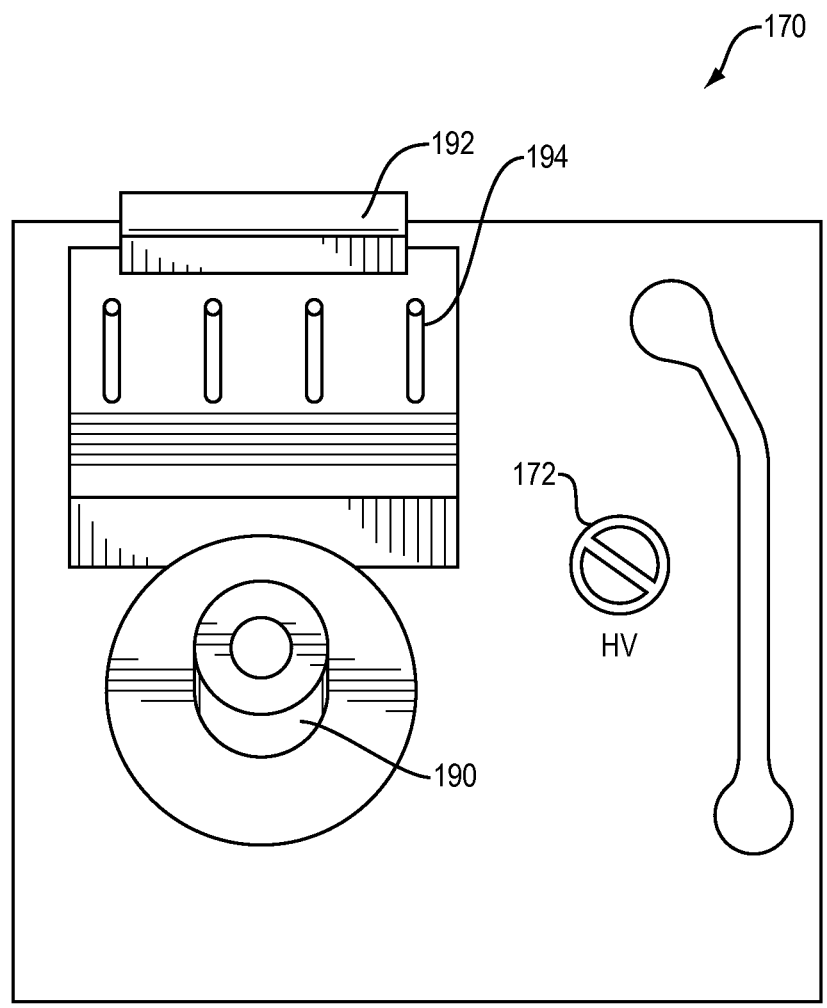
FIG. 8A is a front view of the system of FIG. 7.

The power supply system 170 has a reference voltage circuit 80 for receiving an input voltage 54 and a control 116, such as a second voltage, for generating/setting the output reference voltage 130. The reference voltage circuit's 80 primary components are an operational amplifier 82 and a potentiometer 132. The potentiometer 132 is adjustable with a mechanical device 172, as seen in FIG. 8A. The output voltage of the system 170 can be set with the potentiometer 132 or by varying the voltage of the control 116.

The sine wave power oscillator circuit 24 of the system 170 is connected to the reference voltage circuit 80. The sine wave power oscillator circuit 24 generates an alternating current. The sine wave power oscillator circuit 24 uses a pair of transistors 44 in parallel and several diodes 50 to generate an alternating current.

The emitters 176 of both of the transistors 44 of the sine wave power oscillator circuit 24 of the system 170 are connected to the controlled current source circuit 38. A pair of transistors 60 of the controlled current source circuit 38 have their bases 136 connected together and connected to the control amplifier circuit 68. The transistors 60 in the controlled current source circuit 38 are identical to each other and identical to the transistors 44 in the sine wave power oscillator circuit 24.

As indicated above with respect to FIG. 6, the control amplifier circuit 68 is connected to both the reference voltage circuit 80 and the controlled current source circuit 38. The control amplifier circuit 68 has an operational amplifier 66 in addition to resistors and a pair of capacitors in parallel in the embodiment shown.

Still referring to FIG. 7, the resonant transformer 26 of the system 170 is connected to the input voltage 54, the sine wave power oscillator circuit 24, and the multiplier 162. The multiplier 162 is a series of diodes 178 and capacitors 182 to create multiple taps each having a different voltage. In addition to being connected to the secondary winding of the resonant transformer 26, the multiplier 162 is connected to the buffer high voltage feedback circuit 90.

In the embodiment shown, there are ten (10) taps on the multiplier 162. The system 170 has a terminal 184 which connects to the multiplier 162. The terminal 184 has twelve (12) sockets 186.

The buffer high voltage feedback circuit 90 of the system 170 is a feedback loop to control the voltage of the output, that is at the multiplier 162 and the terminal 186. The buffer high voltage feedback circuit 90 is connected to the control amplifier circuit 68.

The system 170 in addition has a buffer preamp 188. The buffer preamp 188 has a sub-miniature C bulkhead connection 190.

Referring to FIG. 8A, a front view of the Preamp and High Voltage Power supply system 170 is shown. A four interface plug 192 of the system 170 is shown. The four interfaces are for the input voltage 54, the control 116, the high voltage out 118, and the ground 124 as seen in FIG. 7. The sub-miniature C bulkhead connection 190 for the buffer preamp 188 is also shown. The potentiometer 132 is adjustable with a mechanical device 172.

Figure 8B:
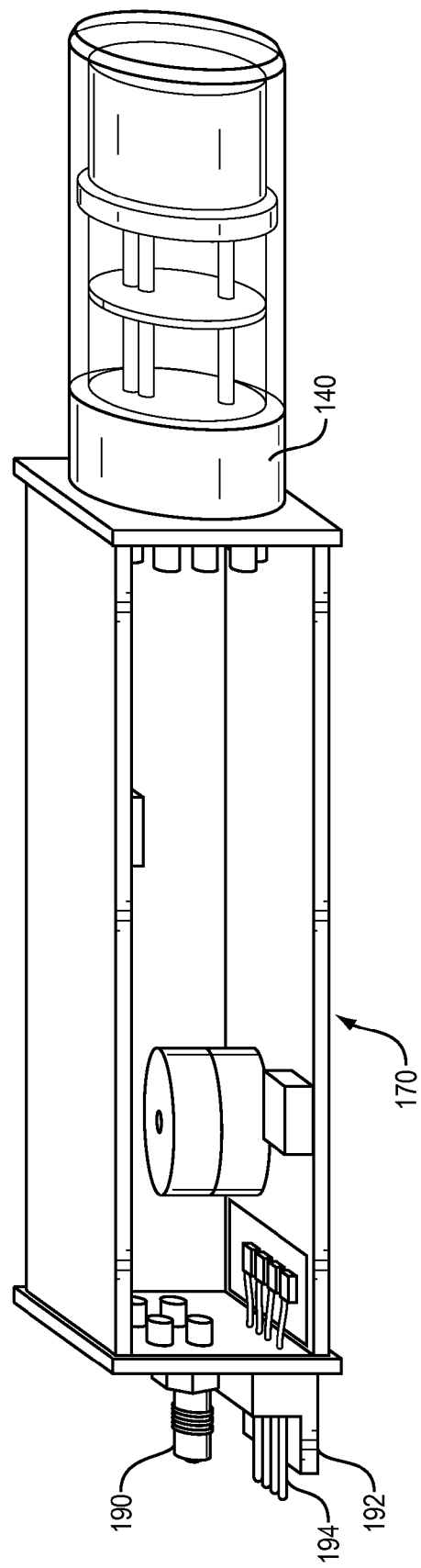
FIG. 8B is right side view of the system of FIG. 7 with a PMT.

Referring to FIG. 8B, the right side view of the system 170 with a PMT 140 is shown. The pins 116 of the interface plug 192 are shown on the left side of the FIG. The mechanical device 172 for the potentiometer 132 is not seen in that it is flush with the side. The sub-miniature C bulkhead connection 190 for the buffer preamp 188 is also shown. The PMT 140 has twelve (12) pins for connecting to the system 170.

In one embodiment of the system 170 represented in FIG. 7 and shown in FIGS. 8A and 8B, the resonant transformer 26 has 36 primary windings and 218 secondary windings. The four transistors 44 and 46 are identical and are MMBT3904

In the embodiment described above with the specific components described with respect to FIG. 7 and shown in FIGS. 8A and 8B, the power supply system 170 had only Johnson noise present at the output, and no visible noise from the power supply. Johnson noise, roughly defined, is the random variation of voltage due to the thermal agitation of charge carriers in a resistor. The system 170 as built is 0.8 inches by 0.8 inches and 3 inches long.

The power consumed by the particular embodiment of the system 170 including the preamp 188 is 15 to 50 mW depending upon output voltage. About 10 mW is consumed by the high speed, low noise preamp. This is in contrast to a conventional commercial power supply which requires from 350 to 750 mW, and requires additional noise filtering. The system 170 demonstrated a larger dynamic signal range for the PMT 140 than obtained with a conventional supply.

Figure 9:
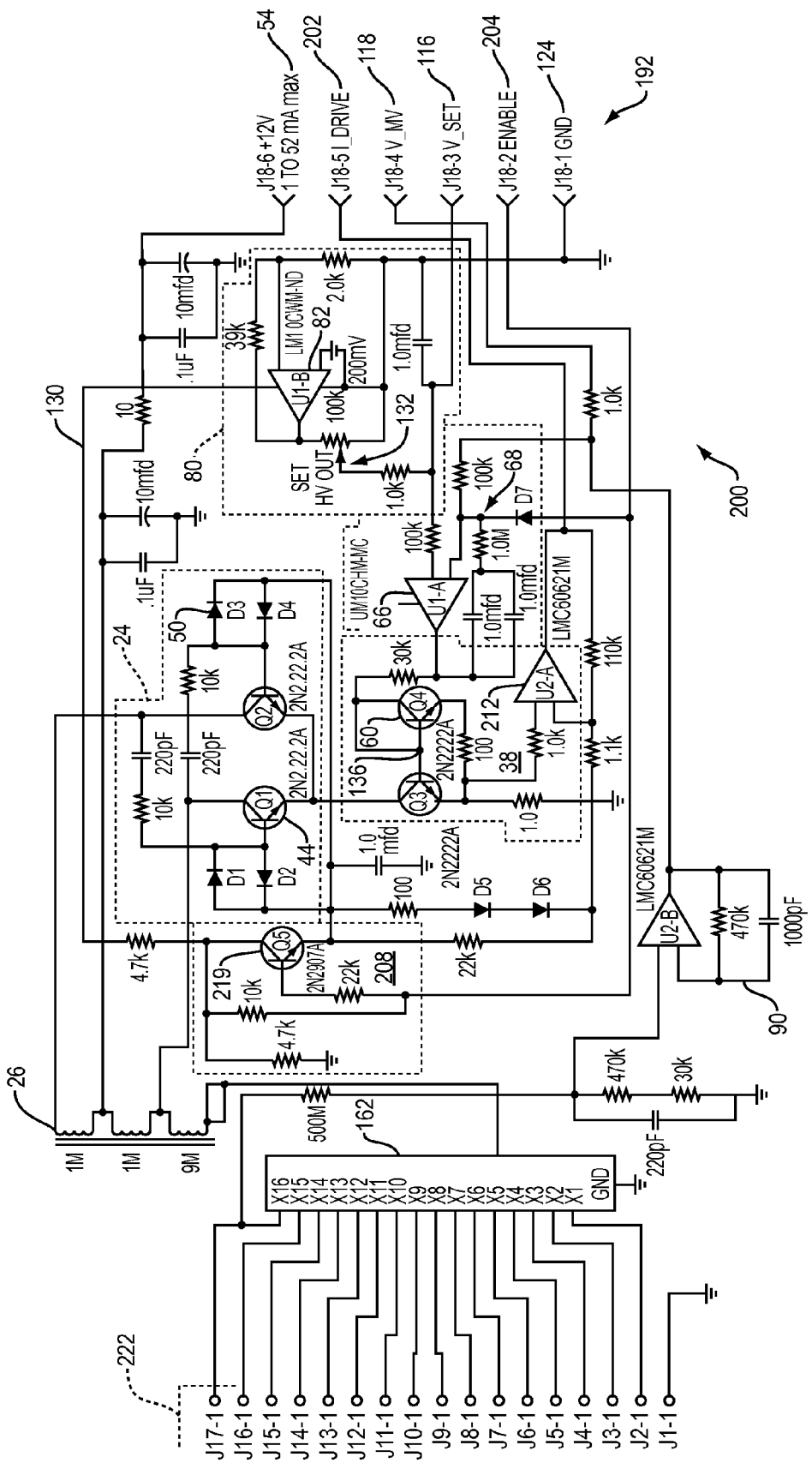
FIG. 9 is a circuit diagram of a MCP Power Supply system according to the invention.

Referring to FIG. 9, a circuit diagram of a MCP Power Supply system 200 is shown. The MCP Power supply system 200 with 16 uniform taps can be used with a dual MCP (Multi-Channel Plate) detector. Similar to FIG. 7 with respect to the system 170, in describing the system 200 reference will be made to the circuits described above with respect to FIGS. 3 and 6 and certain components will be discussed. Not all the components will be discussed; one skilled in the art will be able to discern components from the diagram of FIG. 9.

The system 200 has the interfaces of an input voltage 54, a control 116, the voltage set, and a high voltage out 118. The circuit also has a ground 124, which will not be discussed in detail. In addition, the system 200 has a current drive, I-drive, 202 and an enable input 204 which are different than in the system 170 described above. These interfaces will be described in more detail below.

The power supply system 200 has a reference voltage circuit 80 for receiving an input voltage 54 and a control 116, such as a second voltage, for generating/setting the output reference voltage 130. The reference voltage circuit's 80 primary components are an operational amplifier 80 and a potentiometer 132. The potentiometer 132 is adjustable with a mechanical device 172. The output voltage of the system 200 can be set with the potentiometer 132 or by varying the voltage of the control 116.

The reference voltage circuit 80 of the system 200 is connected to an enable control circuit 208. The enable control circuit 208 has a transistor 210 that is turned on by the enable input 204. The enable control circuit 208 activates both a sine wave power oscillator circuit 24 and a controlled current source circuit 38 of the system 200.

The sine wave power oscillator circuit 24 generates an alternating current. The sine wave power oscillator circuit 24 uses a pair of transistors 44 in parallel and several diodes 50 to generate an alternating current.

The emitters of both of the transistors 44 of the sine wave power oscillator circuit 24 of the system 200 are connected to the controlled current source circuit 38. A pair of transistors 60 of the controlled current source circuit 38 have their bases 136 connected together and connected to the control amplifier circuit 68. The transistors 60 in the controlled current source circuit 38 are identical to each other and identical to the transistors 44 in the sine wave power oscillator circuit 24.

In the embodiment discussed above with respect to FIG. 7, the emitters of the transistors 60 were tied to the ground 124. In contrast in the system 200 shown in FIG. 9, the emitters of the transistors 60 are connected to an operational amplifier 212 through several resistors. The operational amplifier 212 is connected to the current drive 202. It is also noted that the emitters of the transistor 60 of the controlled current source circuit 38 are linked to the transistor 210 of the enable control circuit 208.

As indicated above with respect to FIG. 6, the control amplifier circuit 68 is connected to both the reference voltage circuit 80 and the controlled current source circuit 38. The control amplifier circuit 68 has an operational amplifier 66 in addition to resistors and a pair of capacitors in parallel, in the embodiment shown.

Still referring to FIG. 9, the resonant transformer 26 of the system 200 is connected to the input voltage 54, the sine wave power oscillator circuit 24, and the multiplier 162.

In contrast to the embodiment shown in FIG. 7, the multiplier 162 is not shown as a series of diodes 178 and capacitors 182 to create multiple taps each having a different voltage. Rather the multiplier 162 is a potted assembly. In addition to being connected to the secondary winding of the resonant transformer 26, the multiplier 162 is connected to the buffer high voltage feedback circuit 90.

In the embodiment shown, there are sixteen (16) taps on the multiplier 162.

The buffer high voltage feedback circuit 90 of the system 200 is a feedback loop to control the voltage of the output, that is at the multiplier 162. The buffer high voltage feedback circuit 90 is connected to the control amplifier circuit 68. The system 200 has a terminal 222 with sixteen (16) sockets for connecting the sixteen (16) socket outputs from the multiplier 162 to a device such as a PMT.

In an embodiment of the MCP version of the power supply 200, the supply is a high power version that delivers about 200 mW of HV out, with 16 uniform taps for use with a dual MCP (Multi-Channel Plate) detector. While having numerous uses, one particular use of this embodiment is a low noise, high power supply capable of working in close proximity to a detector under vacuum with minimal noise at the background thermal noise levels. Other applications include powering standard PMTs and experimental Si-PMT units. The output voltage can be stability set over a range of 50 volts to 4,000 volts, and the power taken from any tap or combination thereof so long as the total is less than about 200 mW total.

While each embodiment has the standard building blocks of the present invention as described in FIGS. 1 and 6, it is recognized that various embodiments are suited for particular uses better than other embodiments. For example the power supply 20 and in particular the power supply system 170 of FIGS. 7, 8A, and 8B provides a means to power a multi-dynode PMT and similar detectors requiring no more power than the active signal by eliminating the use of the traditional resistive biasing network, while maintaining a precise and highly stable inter-dynode voltage independent of varying signal levels. At the same time, the associated drive approach is fully sinusoidal so that there are minimal noise transients coupled into the detected signal. It provides both an extremely stable, highly precise ratio metric dynode biasing that is maintained independent of a very large dynamic signal range in the PMT. While the application is for use in photon counting, the same advantages apply for average intensity measurements as well.

The ratio of the typical reduction in power of the power supply system 20 and in particular the embodiment shown in FIG. 7 compared to a conventional approach is given by:

$$P_{CONVENTIONAL} / P_{INVENTION} = 1 + \frac{(n*r)}{\frac{1}{G^{\frac{1}{n-1}}}}$$

where n is the number of dynodes in the PMT 140, r is the ratio of current in the standard resistive divider for the traditional PMT design, and G is the total PMT gain. For a conventional PMT, vendors recommend r to be between 10 and 100. $G^{1/n}$ is the gain for an individual dynode. This assumes that all dynodes have the same voltage drop across the tube, and will differ with a non-uniform distribution. For example, for a 10 dynode tube with the resistor bias current 10 times the average signal current and a gain of $10^6$, the reduction in power required will be about 75.9:1.

In one example, a conventional design will typically require about 759 mW to operate compared to about 10 mW for the embodiment shown in FIG. 7. This dramatic reduction in required power means that the tube will experience proportionally less thermal drift resulting from the dissipation of the bias network, and reduced thermal aging effects. Also, due to the nature of the operation, component tolerances are not critical for precision operation of the divider, while interdynode voltages are precisely maintained. Ultimate accuracy and stability is determined by only a few low stressed components, providing exceptional reliability.

With the power supply system 20 short circuit and overload limiting for the circuit and associated PMT 140 is inherent and automatic. Recovery from overload or short is automatic, with very low likelihood of consequential component overstress and/or failure.

While the above-embodiment describes one general area where the power supply 20 can be used, it is recognized that the power supply 20 can be used in a range of applications. The embodiments discussed above are high voltage for use with photomultiplier tubes (PMT) with a range of 0-10 kV, multiple taps. Other high voltage supply configurations can be for accelerator applications, including X-ray generator systems, that have a voltage requirement of 10 kV and higher. In addition to high voltage, the power supply 20 can be used for low voltage requirements. The low voltage (LV) has low noise with minimal filtering, with better efficiency than linear.

In addition to variations in desired voltage ranges, the power supply 20 has other benefits including high efficiency and high speed. Additional optional pre-conditioner fixed switching regulation for higher efficiency with less noise than standard switching supply, including isolation without requiring conventional isolated coupling, as opto-coupler or magnetic coupler. Furthermore, simplicity of design and offset output option permits multiple supplies in cascaded configuration for a very high speed slewing supply for specialized applications.

As evident from above, the high voltage (HV) power supply is capable of high power output with a simple drive that has inherent current limits without complex and expensive designs to implement. The low parts count and uniform voltage distribution of the design minimizes failures in over-load conditions (shorted output). The output is inherently low ripple, so it minimizes the HV parts to filter the output that are expensive and low reliability due to high voltage stress.

In the low voltage (LV) design, the inherent low noise level as the result of the pure sine wave operation eliminates the high frequency hash inherent in switch mode regulators, although with lower efficiency. While a hybrid design can exhibit a higher efficiency and maintain the lower output noise, a pure switching mode unit may have a higher overall efficiency.

In a low voltage design, primary feedback can be used for control of the output. This allows for totally isolated operation without requiring an opto-isolator or magnetic isolation. The design can easily have an enable/disable control, making it a good choice for transmitting power across a HV boundary with only a single magnetic link across the boundary, while maintaining good voltage regulation of the output.

It is recognized that in certain embodiments, it may be desirous to have higher speeds for those applications requiring high voltage outputs and a very fast slewing of the output voltage. Two units can be configured easily with low parts count to achieve a fast unit. A standard, slower unit would provide the majority of the HV, and a low voltage unit with a fast slewing rate would provide incremental changes, so that settling times of a few microseconds could be achieved for steps, while providing a large HV range of operation. The best operation would be achieved for increasing slews, and relatively slow for decreasing voltage due to the limited rate of discharge of the output voltage. The unit would permit easy implementation of a flag when the output is stable, permitting faster adaptive delay when slewing through a range of steps.

While the key characteristics of the power supply 20 have been described above throughout the description of the embodiments described above, some of these characteristics are spelled out again in bullet format.

Requires $\frac{1}{10}$ to $\frac{1}{100}$ of the power of the resistive approach.

All taps are regulated, significantly extending the linear operating range of the PMT without the higher power normally required, to the maximum rated plate current of the PMT.

Inherently power limited, so it can automatically protect a PMT from accidental exposure to ambient room light with HV applied.

The minimal parts count with low stress on the components permits very small package size and high reliability.

The power reduction and efficiency minimizes heat dissipation in proximity to the PMT, thereby minimizing thermal noise and drift in the tube and scintillator assemblies.

In the negative supply version, the design can provide continuous light level detection as well as photon detection, while maintaining high linearity.

One of the above embodiments, as mentioned previously, describes the power supply 20 with use with a photomultiplier tube (PMT) 140. For PMT manufactures, it would permit a support product line for their PMT or other detectors that provide a small low noise supply, including potential portable applications with a low cost, low noise supply that enable battery powered applications that currently are not possible.

Such a supply could be used in either of two ways. The first way would work with conventional resistive dividers, as a lower cost, low noise, and simpler version of existing supplies. This would be the path of least resistance, since it would use existing tube specific dividers. The second way would be in dedicated very low power versions as with the prototypes above, tailored to specific tubes and tube families, where small size, very low power requirements, and low noise are an advantage. This version would be a replacement for the current resistive divider modules supplied by the vendor, with a similar package size. Such units would have the advantage of no additional power supply being required, and would eliminate the issue of the HV cabling and connectors.

In addition to the uses recited above, the following are other potential uses. The power supply system 20 can be used in a space applications. The supply 20 in its very small form factor and with the advantages of very low power and low noise.

Another use for the power supply 20, in addition with PMT, is for a PC Tube (Proportional Gas Counter Tube) in an Alpha Detector System. The power supply 20 features of an adjustable range and low noise make the supply with the PC Tube. A second version of the power supply can be used in the same system for an isolated low voltage supply without secondary feedback isolation across a HV boundary on the order of 5 to 10 KV.

The power supply 110 of FIG. 4 that has a voltage range of −20 KV to −30 KV HV combined with low noise, small size, and efficiency lends its use in other space missions, such as a solar probe. The problem with conventional power supplies are that they are too large and have relatively low efficiency. Likewise the power supply 200 of FIG. 9 can be used to supply up to 4,000 V MCP tube bias where noise and efficiency are concerns. Another use is for a high slew rate mass spectrometer power supply for ion species selection and focus where again small size and low noise performance are advantages.

As indicated above, some of the uses would include a photomultiplier tube 140, such as in space applications. Space applications would include mass spectrometer applications where a low noise, low mass high voltage supply 170, such as shown in FIG. 7, would be ideal.

One advantage of the power supply system 20 is in isolated power applications where the simple single magnetic link would be an advantage, and the inherent radiation tolerance of the components would extend reliability and operating life, as well as the lack of switching noise to contaminate sensitive detection systems.

Another application of the power supply is in a medical application. For example, in detector applications, where the small size of the power supply system 20 would be an advantage with detectors and the low cost would permit stand-alone calibration. The isolated supplies would be advantageous for the high isolation for power supplies to assure patient safety, and the low noise would permit operation without disrupting sensitive equipment such as encephalographs and heart monitors.

It would be useful for portable instruments as portable X-ray instruments based upon the HV version of the unit, and for powering the detectors for imaging.

In addition to the more exotic embodiments of space and industrial uses, the power supply system 20 according to the invention can be used for more conventional uses such as lighting applications. For example the power supply can be used as off-line supplies for Compact Fluorescent devices applications or LED (Light Emitting Diodes) drives, operating in regulated current mode. The small size and efficiency would be an advantage in providing low cost solutions for power conversion that could also include power factor correction, currently a problem with existing low cost designs.

In addition, the power supply would be suitable for laser power supplies, where there is a high ignition voltage required to start, and a current drive once started. The sine wave resonant design would permit a low parts count solution to the nominally conflicting requirements of such applications.

The above are just a few examples. It is recognized that the power supply as described above is well suited for those applications that require a general-purpose low noise supply with multiple outputs and voltage and current conversion than can be easily provided with a linear supply. The applications would be those where the compact size and low noise requirements outweigh requirements for high efficiency performance. There may be other applications that require a sturdy supply capable of HV output and severe discharge requirements without damage, or a range of applications yet to be identified.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

It is recognized that customization may be desired for use with various tube configurations in order to obtain the maximum power reduction. However it is recognized that versions such as the MCP version of the system can be used with the traditional resistive divider on the tubes. While it would not provide the dramatic power reduction, it would have the advantages of very low noise, low component count, and robustness under short circuit conditions.

It is also recognized that the driver portion of the power supply system 20 can be standardized for the low power versions, so that to match the unit to a specific family of PMT tubes 140, only the transformer 26 turns ratios and output multipliers 162 would differ. This could permit a high level of standardization.

What is claimed:

1. A power supply comprising:
   a sine wave power oscillator circuit for generating an alternating current;
   a controlled current source circuit connected to the sine wave power oscillator circuit for regulating the current level to the sine wave power oscillator;
   a control amplifier circuit connected to the controlled current source circuit, the control amplifier circuit for controlling the current level to the controlled current source circuit and having a feedback circuit for providing a feedback loop to regulate the output voltage; and
   a resonant transformer and capacitor connected to the sine wave power oscillator circuit, the resonant transformer generating scaled voltages and currents on a secondary winding or in an autotransformer mode wherein the power capabilities of the power supply are determined by the resonant characteristics of the transformer and capacitor system.

2. A power supply of claim 1 wherein the resonant transformer generating scaled voltages and currents on a secondary winding.

3. A power supply of claim 1 wherein the resonant transformer generating scaled voltages and currents in an autotransformer mode.

4. A power supply of claim 1 wherein the buffer high voltage feed circuit is connected to the multiplier for providing a feedback from one of the plurality of higher output voltages.

5. A power supply of claim 1 wherein the voltage control is an onboard potentiometer.

6. A power supply comprising:
   an internal or external reference voltage circuit for receiving an input voltage and a control;
   a controlled current source circuit connected to the sine wave power oscillator circuit for regulating the current level to the sine wave power oscillator;
   a control amplifier circuit connected to both the reference voltage circuit and the buffer feedback circuit to provide the input to the controlled current source circuit, the control amplifier circuit for controlling the current level to the controlled current source circuit;
   a resonant transformer connected to the input voltage and the sine wave power oscillator circuit, the resonant transformer for generating an output voltage or current on one or more secondary windings;
   a buffer voltage or current feedback circuit connected to an output voltage or current of the power supply and the control amplifier circuit for providing a feedback loop to regulate the output; and
   may include a multiplier having a plurality of taps wherein the power supply provides a higher output voltage and the multiplier provides a plurality of higher output voltages.

7. A power supply of claim 6 wherein the buffer high voltage feed circuit is connected to the resonant transformer for providing a feedback from the higher output voltage on the secondary winding.

8. A power supply of claim 6 wherein the voltage control is set by supplying an adjustable external voltage to the control.

9. A power supply of claim 6 wherein the sine wave power oscillator is differential.

10. A power supply of claim 6 wherein the multiplier has multiple equally spaced taps.

11. A power supply of claim 10 wherein the taps have dividers to provide voltages between the equally spaced voltages.

12. A power supply of claim 6 wherein the power supply is used for space applications.

13. A power supply of claim 6 wherein the power supply is used for medical applications.

14. A power supply of claim 6 wherein the power supply is used for lighting applications.

* * * * *